A. A. TIRRILL.
ELECTRICAL REGULATOR.
APPLICATION FILED MAR. 3, 1914.

1,192,708.

Patented July 25, 1916.

WITNESSES:
Fred H. Miller
Otto J. Schairer

INVENTOR
Allen A. Tirrill
BY
Wesley G. Carr
ATTORNEY

UNITED STATES PATENT OFFICE.

ALLEN A. TIRRILL, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL REGULATOR.

1,192,708.    Specification of Letters Patent.    Patented July 25, 1916.

Application filed March 3, 1914. Serial No. 822,131.

*To all whom it may concern:*

Be it known that I, ALLEN A. TIRRILL, a citizen of the United States, and a resident of Pittsburgh, in the county of Allegheny and State of Pennsylvania, have invented a new and useful Improvement in Electrical Regulators, of which the following is a specification.

My invention relates to electrical regulators of the kind in which the regulation is effected by opening and closing a shunt circuit to a resistance in series with the field magnet winding of an exciter or other dynamo-electric machine.

The object of my invention is to provide a regulator of the character indicated that shall be adapted to regulate for wide variations of load or other electrical conditions, and that when subjected to such service shall be thoroughly effective and reliable.

Figure 1:
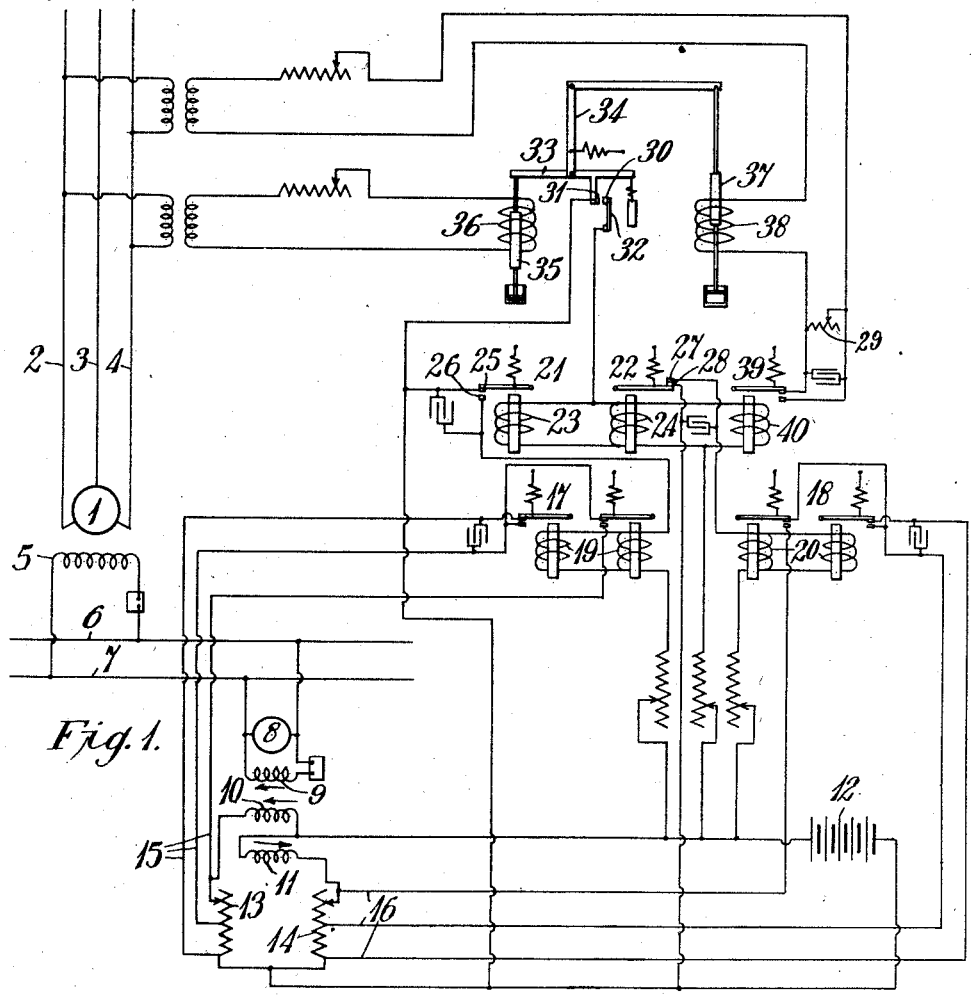
Figure 2:
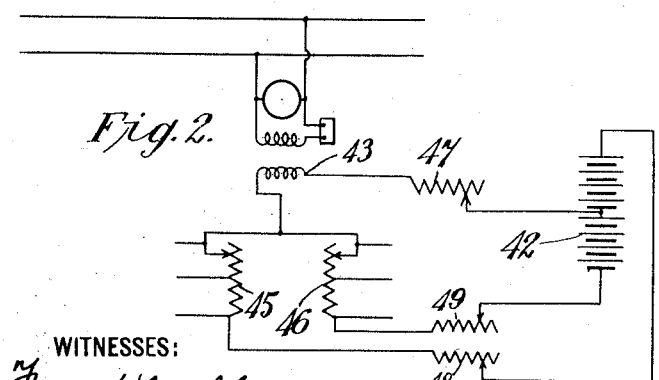

My invention is illustrated in the accompanying drawing, Figure 1 of which diagrammatically represents a system of distribution embodying my invention, and Fig. 2 is a diagrammatic illustration of a modification of the system of Fig. 1.

The system illustrated, which is only one of many in which the present invention may be employed, comprises a generator 1 that supplies current to a distributing circuit 2—3—4, and that is provided with a field magnet winding 5. The field magnet winding 5 is supplied with current from exciter bus bars 6—7, to which is connected an exciter 8 having a shunt field magnet winding 9 and opposing auxiliary field magnet windings 10 and 11, the former being arranged to supplement the shunt field magnet winding 9, and the latter to oppose it. The field magnet windings 10 and 11 are supplied with current from a storage battery 12, or they may be connected to any other suitable source, and suitable variable resistors 13 and 14 are respectively connected in series therewith.

The resistors 13 and 14 are divided into a plurality of sections by means of leads or taps 15 and 16 that are respectively connected to the contact terminals of two sets of relays 17 and 18, which serve to connect and disconnect the said taps or leads, and to thereby establish shunt circuits to the resistors for the purpose of varying their effective values. While only two relays are included in each set, obviously a larger number may be employed if desired, or if conditions demand them. The relays 17 and 18 are respectively provided with energizing windings 19 and 20 to which current is supplied from the battery 12 or any other suitable source.

The circuits of the windings 19 and 20 are respectively controlled by two other relays 21 and 22 having energizing windings 23 and 24, respectively, that are also supplied with current from the battery 12 or another suitable source. The relay 21 comprises a movable contact terminal 25 and a stationary terminal 26 that is placed below it and is adapted to coöperate therewith. In the relay 22, however, the stationary contact terminal 27 is mounted above the movable terminal 28. Because of this arrangement, the contact terminals of the relay 21 are caused to engage, while those of the relay 22 are caused to disengage when the windings 23 and 24 are energized.

The circuits of the relay windings 23 and 24 are governed by a pair of coöperating contact members 30 and 31, respectively, the former of which is resiliently mounted, as, for instance, by being placed upon the free end of a plate spring 32, and the other of which is mounted upon a depending arm of a lever 33. The lever 33 is pivotally supported at the lower end of the vertical arm of a bell crank lever 34 and is actuated by an electromagnet comprising a core 35 and a solenoid 36 that is supplied with current proportional to the voltage of the distributing circuit 2—3—4. The position of the contact terminal 31 is thereby caused to vary in accordance with the voltage of the distributing circuit, though, if desired, its position may be varied in accordance with any other desired electrical condition of a circuit.

The lever 34 is actuated by an electromagnet comprising a core 37 and a solenoid 38 that is supplied with current from the distributing circuit 2—3—4 but that may be supplied from any other suitable source of current, a resistor 29 being connected in series with the winding 38. A shunt circuit to the resistor 29 is adapted to be opened and closed by means of a relay 39 having an energizing winding 40 that is connected in parallel with the windings 23 and 24, and the circuit of which is similarly controlled by the contact members 30 and 31.

The relay 39 causes the winding 38 to be alternately fully and partially energized with the result that the contact terminal 31 is vibrated into and out of engagement with the terminal 30. The periods of engagement and disengagement of the said members depend upon the initial distance between, or the relative positions of, the contact terminals 30 and 31 as determined by the coil 36.

In the operation of the regulator, the engagement and disengagement of contact terminals 30 and 31, which takes place as above described, serves to close and open the circuits of the relay windings 23, 24 and 40. The effect of opening and closing the circuit of the winding 40 has already been described. When the relay windings 23 and 24 are energized, the contact terminals 25 and 26 are caused to engage, while the contact terminals 27 and 28 are caused to disengage. The windings 19 of the relay 17 are, accordingly, energized, and the resistor 13 in the circuit of the auxiliary field magnet winding 10 is short circuited. The auxiliary winding 10 then becomes more strongly energized than the winding 11, and, being arranged to assist the main field magnet winding 9, the voltages of the exciter and generator are correspondingly increased. On the other hand, when the relay windings 23 and 24 are deenergized, the contact terminals 25 and 26 are caused to disengage, and the terminals 27 and 28 to engage. The circuits of the windings 20 of the relays 18 are thereby established, and the resistor 14 in the circuit of the auxiliary field magnet winding 11 is short circuited. The winding 11 then predominates over the winding 10, and, being arranged to oppose the winding 9, the voltages of the exciter and generator are correspondingly reduced. The relation of the periods of engagement and disengagement of the contact terminals 30 and 31, which is determined by the voltage of the distributing circuit, also determines the relation of the periods during which the resistors 13 and 14 are short circuited, the arrangement being such that the regulator operates to maintain the voltage of the circuit 2—3—4 substantially uniform, notwithstanding considerable variations of load upon the circuit.

The employment of two relays 21 and 22 for the purpose of governing the shunt circuits to the exciter field resistors 13 and 14, permits of separate adjustment of the relations of the contact terminals that are respectively associated with said resistors to compensate for wear and to give the most desirable conditions of operation. Since the two sets of terminals may wear unequally, and since one relay may be required to operate under different conditions from the other, this independence of adjustment is particularly advantageous, and results in greater effectiveness and reliability of operation of the regulator.

In Fig. 2, I have shown a modification of a portion of the system of Fig. 1 in which a single auxiliary field magnet winding 43 is provided for the exciter, one terminal of which is connected to the middle or another suitable intermediate point of the battery 42, and the remaining terminal is connected through resistors 45 and 46 to the respective terminals of the battery. A resistor 47 is included in the connection of the winding 43 to the middle point of the battery, and other resistors 48 and 49 are connected in series with the resistors 45 and 46 so that, in case the latter resistors become permanently short-circuited, the battery cannot be short-circuited.

I claim as my invention:

1. The combination with a dynamo-electric machine having opposing field magnet windings, of a regulator comprising coöperating contact members, a winding for causing said contact members to engage and disengage, three relays controlled by said contact members, one of which in turn controls the circuit of the said regulator winding, and the other two of which respectively control the energization of said field magnet windings.

2. The combination with a dynamo-electric machine having opposing field magnet windings, of a regulator comprising coöperating contact members, a winding for causing said contact members to engage and disengage, three relays controlled by said contact members, one of which in turn controls the circuit of the said regulator winding, and the others of which respectively and oppositely control the energization of said field magnet windings.

In testimony whereof, I have hereunto subscribed my name this 20th day of Feb. 1914.

ALLEN A. TIRRILL.

Witnesses:
OTTO S. SCHAIRER,
B. B. HINES.